United States Patent
Natanzon et al.

(10) Patent No.: US 11,249,856 B2
(45) Date of Patent: Feb. 15, 2022

(54) APPLICATION CONSISTENT SNAPSHOTS AS A SIDECAR OF A CONTAINERIZED APPLICATION

(71) Applicant: EMC IP Holding Company LLC, Hopkinton, MA (US)

(72) Inventors: Assaf Natanzon, Tel Aviv (IL); Luay Al-Alem, Lynnfield, MA (US); Antony Bett, Shrewsbury, MA (US); Michael Rhodes, Stamford, CT (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 534 days.

(21) Appl. No.: 16/170,393

(22) Filed: Oct. 25, 2018

(65) Prior Publication Data
US 2020/0133789 A1    Apr. 30, 2020

(51) Int. Cl.
*G06F 16/00* (2019.01)
*G06F 11/14* (2006.01)
*G06F 16/23* (2019.01)

(52) U.S. Cl.
CPC ...... *G06F 11/1464* (2013.01); *G06F 16/2365* (2019.01); *G06F 2201/84* (2013.01)

(58) Field of Classification Search
CPC ............. G06F 16/2365; G06F 11/1464; G06F 2201/84
USPC .......................................................... 707/649
See application file for complete search history.

(56) References Cited

U.S. PATENT DOCUMENTS

| | | | | |
|---|---|---|---|---|
| 7,275,177 B2 * | 9/2007 | Armangau | .......... | G06F 11/2074 707/999.202 |
| 7,487,310 B1 * | 2/2009 | Bingham | ............ | G06F 11/1458 707/999.202 |
| 7,587,565 B1 * | 9/2009 | Bingham | ............ | G06F 11/1464 711/161 |
| 7,716,185 B2 * | 5/2010 | Thompson | .......... | G06F 11/1464 707/640 |
| 8,706,833 B1 * | 4/2014 | Bergant | .............. | G06F 16/1844 709/214 |
| 10,853,196 B2 * | 12/2020 | Natanzon | ............ | G06F 11/1469 |
| 2013/0073513 A1 * | 3/2013 | Kemper | ................. | G06F 16/28 707/600 |
| 2015/0301900 A1 * | 10/2015 | Whitehead | .......... | H04L 67/1095 709/219 |
| 2016/0314177 A1 * | 10/2016 | Veeraraghavan | ..... | G06F 16/178 |

* cited by examiner

*Primary Examiner* — Monica M Pyo
(74) *Attorney, Agent, or Firm* — Workman Nydegger

(57) ABSTRACT

Systems and methods for performing data protection operations in a containerized application. A sidecar application is associated with or attached to a main application. The sidecar application has access to the resources of the main application. Backup requests are handled by the sidecar so that the application, which may be stateful, can be placed in a consistent state prior to performing the backup operation. The backup operation is then performed on the consistent application or on the data that is quiesced.

20 Claims, 3 Drawing Sheets

APPLICATION CONSISTENT SNAPSHOTS AS A SIDECAR OF A CONTAINERIZED APPLICATION

FIELD OF THE INVENTION

Embodiments of the present invention relate to systems and methods for performing data protection operations. More particularly, embodiments of the invention relate to systems and methods for backing up applications including cloud native applications, for example applications operating in a containerized environment.

BACKGROUND

The manner in which applications are developed and deployed is constantly evolving. Currently, some applications are developed and deployed using containers and/or microservices. Containerized applications such as microservices provide a number of advantages. The nature of containers and containerized applications allows them to be updated frequently. In fact, it is possible to update portions or specific containers independently of other portions of the application. Further, containerized applications can be scheduled, rescheduled, and moved within a container platform with relative ease.

These advantages, however, complicate the task of protecting a containerized application (e.g., backing up the application). More specifically, part of the difficulty stems from the fact that containers can be updated frequently. Another part of the difficulty is related to the fact that containers may move from one node to another for various reasons (e.g., a node fails, load balancing, resource availability. etc.). These factors each introduce the possibility of data corruption and data loss—particularly for stateful applications.

Containerized applications thus present new challenges with regard to data protection operations such as performing backup operations. The mobility of containerized applications, the frequent updates, and other factors give rise problems not previously encountered. Systems and methods are needed perform data protection operations on containerized applications and to perform data protection operations in containerized platforms and/or microservice environments.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
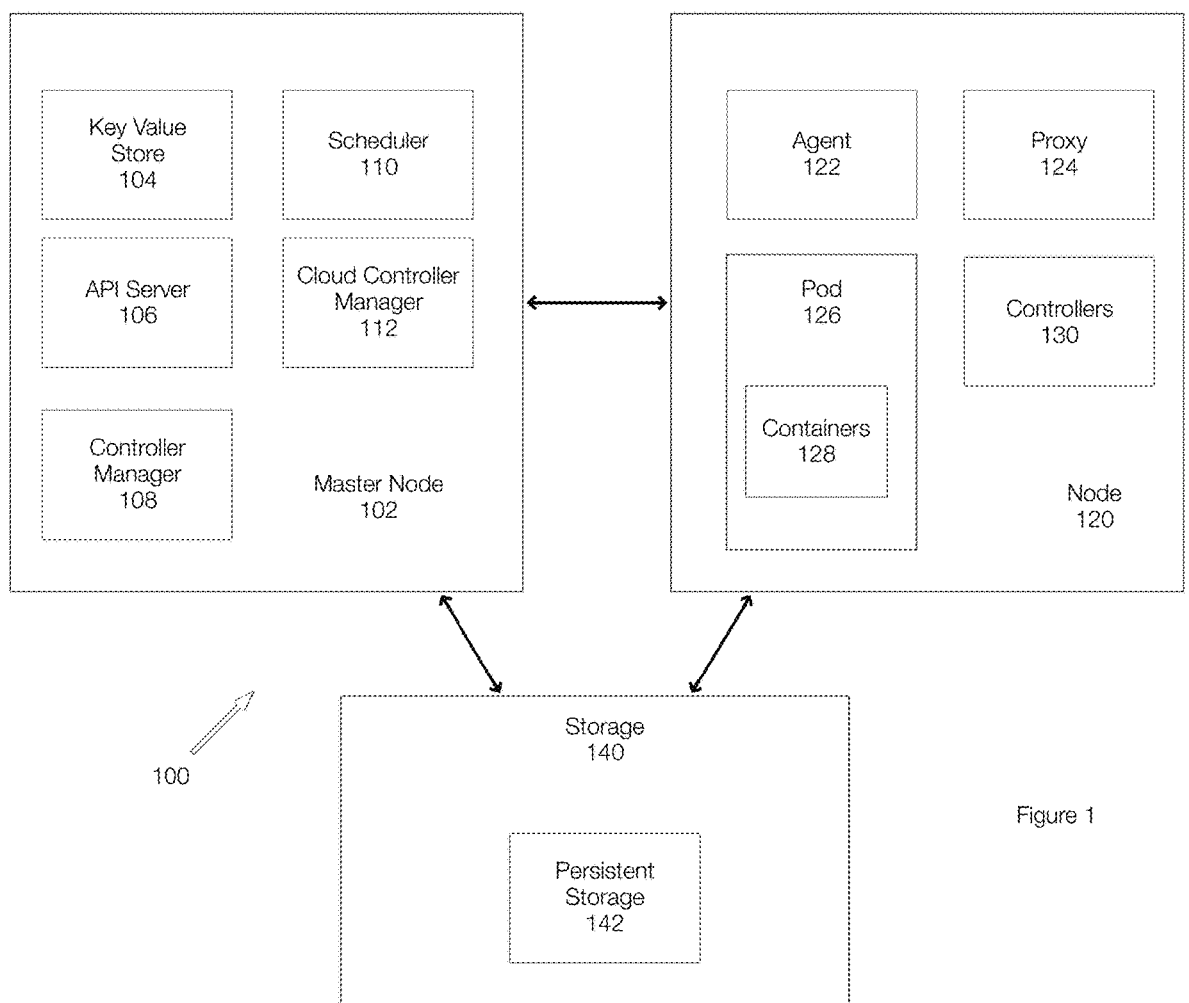
FIG. 1 illustrates an example of a container platform suitable for containerized applications.

Embodiments of the invention relate to data protection systems and methods. Data operations performed by data protection systems include backup operations, restore operations, replication operations, de-duplication operations, discovery operations, retention operations, or the like or combination thereof. Embodiments of the invention further relate to systems and methods for performing backup operations including snapshots of a containerized application. More particularly, embodiments of the invention relate to systems and methods for backing up applications including containerized applications and/or microservices.

Embodiments of the invention may be associated with protecting stateful applications. In one example, a stateful application is often associated with a volume or with storage that stores data. Protecting a stateful application may include protecting (backing up, restoring, etc.) the data stored on the volume.

Containerized applications and microservices are typically deployed in cloud native orchestration platforms. Cloud native orchestration platforms allow applications to be deployed in different deployment patterns. In one example, a sidecar pattern may be used. In a sidecar pattern, a sidecar container or microservice is attached to the main application and provides supporting functionality such as configuration, logging, monitoring, and the like. A sidecar can typically access the same resources as the main application. Embodiments of the invention deploy a sidecar application to provide consistent snapshots of the main application and perform backup operations.

By way of example, a container may be a packaged piece of software that includes everything needed to run. Often, a microservice is run inside a container or in the context of a container. This may include code, runtime, system tools, libraries, settings, operating system and the like.

A container platform is capable of orchestrating or managing container operations or containerized workloads and services. The container platform may orchestrate computing, networking, and storage infrastructure on behalf of user or container workloads. A container platform can simplify platform as a service (PaaS) and infrastructure as a service (IaaS) and enables portability across different infrastructures. Kubernetes (see https://kubernetes.io, which is incorporated by reference) is an example of a platform that automates or orchestrates container operations. The container platform may be configured to manage or control containerized applications that are deployed across multiple hosts, scale applications, and the like.

Container platforms are often used to deploy, as discussed herein, containerized applications. In one example, a container platform can be used in conjunction with a microservice architecture. Microservices, for example, may be deployed in containers as previously stated. As a result, a microservice and a container may be similar if not the same in some situations. In addition, a microservice may be deployed as a virtual machine.

More specifically, containers and microservices are used to build applications and are distinct from a monolithic application. Containers often contain discrete components of an application along with necessary resources. Containers can run practically anywhere and multiple containers can be deployed in a single machine or a single virtual machine.

A microservice may, by way of example, be an application with a small number of functions—often a single function (e.g., routing traffic, analyzing a result, processing a payment, storing data, etc.). Containers are often used to develop and deploy microservices. As a result, container platforms facility management of applications that include multiple microservices.

One of the benefits of containers and microservices is that the development of the application is improved. For example, a container can be upgraded by simply overwriting or replacing the present container (which may be running) with the new container. Thus, the microservice can be updated, restored, etc., by writing the binary.

A mesh platform such as Istio may be deployed in a container platform such as Kubernetes. A service mesh is often used to describe a network of microservices that make up an application and to describe the interactions between the microservices. Capabilities of a mesh platform may include discovery, load balancing, failure recovery, metrics, monitoring, AB testing, canary releases, rate limiting, access control and end-to-end authentication.

A mesh platform may provide various services such as the following One service is traffic management, which controls the flow of traffic and API calls between microservices. Another service is observability, which provides understanding related to the dependencies between microservices. Observability may also identify the flow of traffic between microservices. Policy enforcement is a service that relates to policies. Policy enforcement ensures polices are enforced. In some examples, policy changes can be made by configuring the mesh platform. Service identify and security services ensures that microservices are provided with a verifiable identify and allows traffic to be protected in varying levels.

The capabilities of a mesh platform can reduce dependencies between the microservices themselves or with respect to the application code as a whole. This makes implementation easier and allows applications to be more easily deployed to different environments and to new and different policy configurations.

Microservices are typically composed of one or more of the following parts:
  Container image
  Container metadata
  Environment Variables
  Attached Storage, (persistent volumes)
  Remote services, (databases, message system).
  Platform configuration (scale, state, etc.)
  Host details (where the containers are running)
  Ingress and egress traffic The following discussion provides a description of a container platform. FIG. 1 illustrates an example of a container platform that is configured to schedule and run containerized applications on clusters. The clusters may include physical and/or virtual machines. The container platform may orchestrate computing, networking, and storage infrastructure on behalf of user workloads.

The container platform 100 shown in FIG. 1 may include a master node 102, a node 120 (representative of a plurality of nodes or of a cluster of nodes), and storage 140. Applications running in the container platform 100 may include containers, microservices, back end services, access points (APIs or Application Programming Interfaces) or the like.

The master node 102, which may be present on a single node or spread across a plurality of nodes, may include by way of example various components. These components may include a key value store 104, a scheduler 110, an API server 106, a controller manager 108 and a cloud controller manager 112. T The components of the master node 102 are configured to provide a control plane and make decisions related to the cluster. The master node 102 may make decisions regarding scheduling, detecting and responding to cluster events, or the like.

Master components provide the cluster's control plane. Master components make global decisions about the cluster (for example, scheduling), and detecting and responding to cluster events (starting up a new pod when a replication controller's 'replicas' field is unsatisfied).

The key value store 104 is a component of the container platform that stores cluster data. For example, the key value store 104 may store configuration data that can be used by each of the nodes in the cluster. The key value store 104 can be used for service discovery and represents the state of the cluster. Each component of the container platform may be able to reference the key value store 104 to configure or reconfigure themselves. The key value store 104 may be accessed by, for example, a HTTP/JSON API. Thus, the key value store 104 is associated with an interface that allows values stored in the key value store 104 to be accessed or set as required. The key value store 104 may be stored as a single master node or distributed among a number of master nodes or machines. The key value store 104 is typically available to each node in the cluster.

The API server 106 is typically configured to expose an API or an access point for the container platform 100. The API server 106 functions as a front-end and allows a user to configure workloads and organizational units operating in the container platform 100. The API server 106 may also be responsible for ensuring that the key value store 104 and the service details of deployed containers are in agreement. The API server 106 acts as a bridge between various components to maintain cluster health and disseminate information and commands.

The API server 106 may implement an interface (e.g., a RESTful interface), which allows many different tools and libraries to communicate with the API server 106. A client may be used from a local computer to interact with the container platform 100.

The controller manager 108 is configured to run various controllers. A node controller, for example, is responsible for detecting and responding to node events, such as when a node fails or goes down. A replication controller is configured to maintain a correct number of pods for every replication controller object in the container platform 100. An endpoint controller is configured to populate endpoint objects, for example joining services and pods. A service account and token controller is configured to create accounts and API access tokens for new namespaces.

The details of these operations are written to the key value store 104. The controller manager 108 watches for these changes through the API server 106. When a change is detected or seen, the controller manager 108 (or relevant controller) reads the new information in the key value store 104 and implements a procedure to fulfill the desired state. This may include, for example, scaling an application, adjusting endpoints, or the like.

The scheduler 110 is a component that may be configured to select a node on which newly created pods should run. For example, the scheduler 110 may account for a service's operating requirements and the current infrastructure and then place the work or the new pods on an acceptable node or nodes. The scheduler 110, when making scheduling decisions, may account for various factors such as individual and collective resource requirements, hardware/software/ policy constraints, affinity and anti-affinity specifications, data locality, inter-workload interference and deadlines.

The cloud controller manager 112 may operate as a daemon and may embed cloud-specific control loops. The cloud manager 112 may allow the code of cloud vendors and the code of the container platform 100 to evolve independently of each other.

Some controllers may have dependencies on the cloud provider in which the container platform 100 is implemented. A node controller is configured to check the cloud provider to determine if a node has been deleted in the cloud after the node stops responding. A route controller is configured to set up routes in the cloud infrastructure. The service controller is configured to create, update, and delete cloud provider load balancers. A volume controller is configured to create, attach, and mount volumes. The volume controller may interface with the cloud provider to orchestrate cloud volumes.

FIG. 1 also illustrates a node 120, which is representative of multiple nodes. The node 120, and others similarly configured, perform work in the cluster. The node may include components (e.g., hardware) that are substantially present on all of the nodes in the cluster.

The node 120 may provide a container runtime, which is software responsible for running containers. The node 120 may also include or be associated with an agent 122. The agent 122 typically runs on each node in the cluster and ensures that containers 128 are running in a pod 126. The agent 122 may relay information to and from the control plane (the components on the master node 102). The agent 122, for example, may interact with the key value store 104 to read configuration details or write new values. The agent 122 may communicate with the components on the master node 102 to receive commands and to perform work. The work is often received in a form that defines the workload and the operating parameters. The agent 122 may also assume responsibility for maintaining the state of the work on the node 120.

The proxy 124 may be configured to maintain network rules on the node 120 and perform connection forwarding. For example, the proxy 124 may forward requests to the correct containers, perform some load balancing, and may ensure that the networking environment is predictable and isolated.

The pod 126 may be used to deploy an application. The pod 126 may represent a running process, for example. In this example, the pod 126 encapsulates one or more containers 128, storage resources, a unique network IP, and options that govern how the container(s) should run.

The pod 126 represent a unit of deployment or a single instance of an application. Thus, a single instance of an application may include a single container or a small number of containers that are highly related and that share resources. As a result of these relationships, the containers are typically scheduled on the same node. The containers 128 of the pod 126 are managed as a unit. More specifically, the containers 128 may share volumes and IP space. The containers 128 can be deployed and scaled as a single application. For example, the pod 126 may include a main container that satisfies the general purpose of the pod, and optionally some helper containers that facilitate related tasks. These are programs that benefit from being run and managed in their own container, but are heavily tied to the main application.

The node 120 may also be associated with controllers 130. A replication controller, for example, ensures that that a specified number of pod replicas are running at any one time. In other words, the replication controller ensures that a pod or a homogeneous set of pods is always up and available in the cluster.

A deployment controller provides declarative updates for pods. The deployment controller changes the actual state to a desired state at a controlled rate. A stateful set controller may update a stateful set object, which defines a desired state. A daemon set control ensures that all or some nodes run a copy of a pod. When nodes are added to the cluster, pods are added to the new nodes. As nodes are removed from the cluster, the pods are cleaned up or garbage collection is performed. Deleting a daemon set, for example, will clean up the pods created by the daemon set. A garbage collection controller may delete object that no longer have an owner.

A job controller creates one or more pods and ensures that a specified number of the pods successfully terminate. As pods successfully complete a job, the job controller tracks the successful completions. When a specified number of successful completions is reached, the job itself is complete. Deleting a job will clean up the pods it created.

The container platform may also provide services such as load balancing and networking. A service in a container platform may define a logical set of pods and a policy by which the set of pods are accessed—for example a microservice. A microservice may also be encompassed within a container.

In one example, a microservice may act as a basic load balance and ambassador for other containers. A service may group together logical collections of pods that perform the same function to present them as a single entity. This allows a service unit that is aware of all of the backend containers to pass traffic to to be deployed. External applications only need to worry about a single access point, but benefit from a scalable backend or at least a backend that can be swapped out when necessary. A service's IP address remains stable, abstracting any changes to the pod IP addresses that can happen as nodes die or pods are rescheduled. Services are an interface to a group of containers so that consumers do not have to worry about anything beyond a single access location. By deploying a service, discover-ability is gained and container design is simplified.

FIG. 1 also illustrates storage 140. The storage 140 is associated with the cluster (e.g., the node 120 and the master node 102) and may include distinct storage devices. For example, each node may be associated with its own storage.

The container platform may abstract the manner in which storage is provided and the manner in which storage is consumed. In FIG. 1, the persistent storage 142 represents storage in the cluster that has been provisioned. More specifically, a persistent volume is a resource in the cluster. Similarly, the node is a cluster resource. Persistent volumes may be implemented as plug ins. In one example, a persistent volume may have a lifecycle independent of any individual pod that uses the persistent volume. The storage 140 including the persistent storage 142 may be, by way of example only, NFS, iSCSI, or a cloud-provider-specific storage system.

In a cloud native environment, a single application may include a large number of services. Each of these services may have thousands of instances. Each of these instances may be in a constantly-changing state as they are dynamically scheduled by an orchestrator.

In order to backup up a container platform system (e.g., a Kubernetes system) or an application running therein, there is a need to ensure that the application or microservice is in a consistent state.

In the cloud native application, a single application may include hundreds of services and each service might have thousands of instances. Each of these instances may be in a constantly changing state as they are dynamically scheduled in a container platform.

In container platforms, applications are normally executed either as a stateless process or stateful process. To scale a stateless process, another instance is run. Scaling a stateful service involves setting network intensive distributed state protocols that may be different from system to system. One way to solve stateful needs is to focus on popular stateful services and offer those services as dependencies to applications.

As previously stated, development in container environments allow much faster development, and allow for updating the software frequently (e.g., even several time every day). Often, the persistency layers associated with these applications are external and are provided by platforms or the cloud providers. A new persistent service can be easily added and needs to be protected against data corruption and disaster.

Often, applications and services require related functionality, such as monitoring, configuration, logging and networking services. These peripheral tasks can be implemented as separate components or services. A sidecar service is not necessarily part of the application, but is connected to the application. A sidecar application goes wherever the parent application goes. Thus, if a parent or main application is rescheduled, the sidecar application goes with the main application. Sidecars are supporting processes or services that are deployed with the primary application. A sidecar service may also share the fate of its parent application. For each instance of the application, an instance of the sidecar is deployed and hosted alongside the application.

In order to back up an application, a sidecar application or service is deployed. This provides several advantages. For example, the sidecar can access the same resources that the primary application can access. The sidecar can monitor system resources used by both the sidecar and the primary application. Because of the proximity of the sidecar to the primary application, there is no significant latency when communicating between them. A sidecar can be used to extend the application's functionality by attaching the sidecar as its own process in the same host or sub-container as the primary application. Finally, a sidecar service shares the overall lifecycle of the main application, but can be independently updated.

Embodiments of the invention relate to a sidecar that is attached to a main application (e.g., a mail application, a database application, or other type of application). Attaching a sidecar container to the main application (or container) facilitates performing data protection operations for containerized applications.

A sidecar may be configured to aid with consistency prior to performing a backup such as a snapshot. The sidecar may be configured to ensure that, prior to performing the backup, that the volume or data is in a consistent state. This may include flushing caches, suspending IO operations, or the like. Thus, the sidecar may intercept a backup request (or receive the backup request), run a consistency check, and then initiate the snapshot of the main application.

During this process, the sidecar can detect the operating system of the container or main application, detect the running application type, freeze the input/output, flush the system (e.g., flush caches to disk) and signal that a backup is ready to be performed. Once the backup is complete, I/O (input output) may be restarted.

A sidecar may also be able to detect if the application or container has been rescheduled. As previously stated, an application may be moved to another node for various reasons. This complicates the procedure when a sidecar is not present at least because the application is not tracked. Providing a sidecar improves the operation of data protection operations at least because the location and status of the main application is known. Finally, the sidecar may add metadata to the snapshots and push the snapshot's artifacts to a backup server. The metadata may contain specific information about the main application that is being backed up as well as statistics about the backup itself such as the size of the backup, the date and time of the backup. This metadata will be used for restoration purposes as well as analytics for gathering insights into backups.

Figure 2:
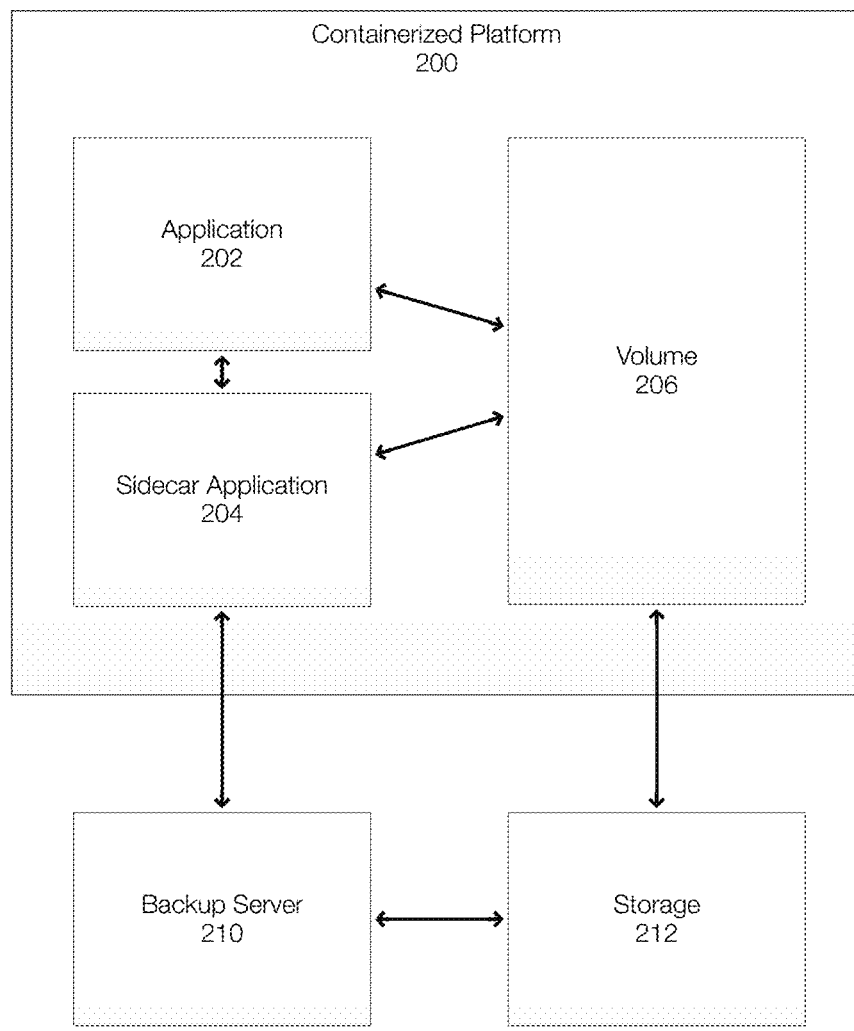
FIG. 2 illustrates an example block diagram of a sidecar application configured to perform a data protection operation.

FIG. 2 illustrates a block diagram of a data protection application configured to operate in a containerized platform. FIG. 2 thus illustrates a containerized platform 200. In the platform 200, an application 202 (e.g., container, microservice, etc.) is operating on a node and is associated with a volume 206. Thus, the data of the application is stored on the volume 206 and the application 202 is a stateful application. The volume 206 may be cloud storage or other persistent storage devices and may include multiple storage devices.

In FIG. 2, a sidecar 202 is associated or attached to the application 202. As a result of the close association, the sidecar 204 has access to the same resources as the application 202. Thus, both the application 202 and the sidecar 204 have access to the volume 206.

The backup server 210 may communicate with the sidecar 204 and/or with the application 202. When a backup operation is performed, for example, the sidecar 204 may intercept the command or receive the command. Because the sidecar 202 has access to the volume 206, the sidecar 204 can freeze input/output operations (I/O), flush the cache, determine the OS of the application 202, and prepare for a consistent backup. The backup can then proceed after the application is in a consistent state. After the backup is performed (which in the case of a snapshot is very quickly), I/O is allowed to resume. The snapshot or other backup may be stored on the storage 212 of the backup server 210.

Figure 3:
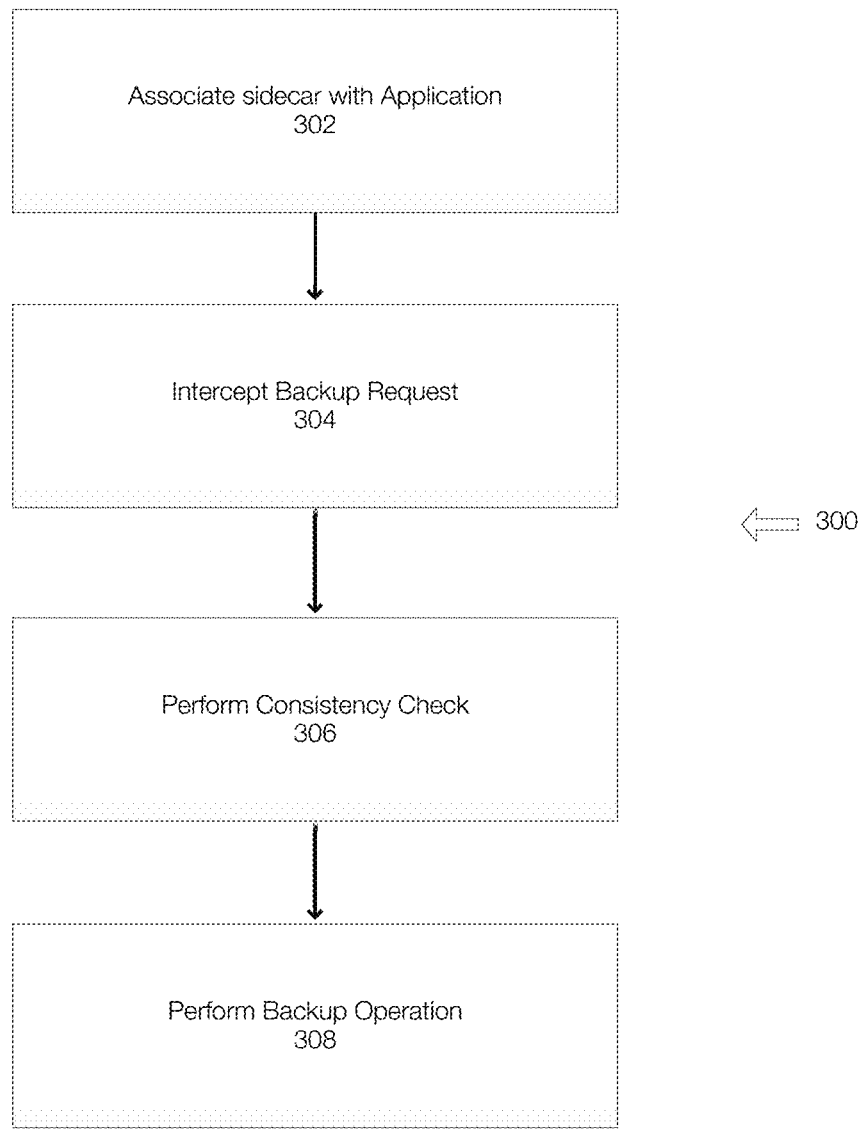
FIG. 3 illustrates an example of a method for performing a backup operation in a containerized computing environment.

FIG. 3 is a flow diagram of an example of a method for performing a backup operation. In the method 300, a sidecar is associated 302 with an application. This is a very close association that allows, as previously stated, the sidecar to go where the parent or main application goes. As a result, if the main application is rescheduled or moved, the sidecar accompanies the main application and is rescheduled at the same time.

Next, a backup request is intercepted 304 by the sidecar. In one example, the sidecar may be the intended recipient of the backup request. Accessing the same resources as the main application, the sidecar can then perform 306 a consistency check. This ensures that the resulting backup is consistent. For example, in the case of a database, performing a consistency check ensures that the backup does not have "torn pages". Rather, the pages of the database backup are complete. Performing the consistency check can include one or more of freezing I/O, flushing caches to disk, determining an application type, determining an OS of the application, or the like or combination thereof.

After the consistency check is performed, a backup operation is performed 308. In a case where a main application has been rescheduled, the sidecar may cause a backup operation to be performed.

It should be appreciated that the present invention can be implemented in numerous ways, including as a process, an apparatus, a system, a device, a method, or a computer readable medium such as a computer readable storage medium or a computer network wherein computer program instructions are sent over optical or electronic communication links. Applications may take the form of software executing on a general purpose computer or be hardwired or hard coded in hardware. In this specification, these implementations, or any other form that the invention may take, may be referred to as techniques. In general, the order of the steps of disclosed processes may be altered within the scope of the invention.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware such as solid state disk (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or target virtual machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for performing a data protection operation on a main application operating in a container platform, the main application associated with resources including a volume, the method comprising:
    associating a sidecar application with the main application such that the sidecar application has access to the resources accessible to the main application including the volume and such that the sidecar application and the main application are deployed to the same node or pod, wherein the sidecar accompanies the main application when the main application is rescheduled to a different node or pod and is configured to track a location of the main application in the container platform;
    intercepting a data protection request from a server by the sidecar, the data protection request configured to trigger a data protection operation on the main application;
    performing a consistency check on the main application by the sidecar application prior to performance of the data protection application;
    determining, by the sidecar, that the main application has been rescheduled, and triggering the data protection operation in response to the main application being rescheduled; and
    performing the data protection operation on the main application, which includes performing the data protection operation on the volume, wherein the sidecar ensures that the data protection operation is performed regardless of whether the main application is rescheduled.

2. The method of claim 1, wherein the data protection operation comprises a backup operation and results in a snapshot.

3. The method of claim 1, wherein performing a consistency check includes determining an operating system of the main application, wherein the operating system influences how the data protection operation is performed.

4. The method of claim 1, wherein performing a consistency check includes freezing input/output operations to the volume.

5. The method of claim 1, wherein performing a consistency check includes flushing data, including cached data to the volume.

6. The method of claim 1, wherein performing a consistency check includes determining an application type.

7. The method of claim 1, further comprising signaling that the data protection operation is ready to be performed.

8. The method of claim 4, further comprising restarting the input/output operations after the data protection operation is completed.

9. The method of claim 1, wherein the data protection operation is a backup operation.

10. The method of claim 9, wherein the main application is rescheduled on a different node.

11. A non-transitory computer readable medium comprising computer executable instructions that, when executed, execute a method for performing a data protection operation on a main application operating in a container platform, the main application associated with resources including a volume, the method comprising:

associating a sidecar application with the main application such that the sidecar application has access to the resources accessible to the main application including the volume and such that the sidecar application and the main application are deployed to the same node or pod of the container platform, wherein the sidecar accompanies the main application when the main application is rescheduled to a different node or pod and is configured to track a location of the main application in the container platform;

intercepting a data protection request from a server by the sidecar, the data protection request configured to trigger a data protection operation on the main application;

performing a consistency check on the main application by the sidecar application prior to performance of the data protection operation;

determining, by the sidecar, that the main application has been rescheduled and triggering the data protection operation in response to the main application being rescheduled; and performing the data protection operation on the main application, which includes performing the data protection operation on the volume, wherein the sidecar ensures that the data protection operation is performed regardless of whether the main application is rescheduled.

12. The non-transitory computer readable medium of claim 11, wherein the data protection operation comprises a backup operation and results in a snapshot.

13. The non-transitory computer readable medium of claim 11, wherein performing a consistency check includes determining an operating system of the main application, wherein the operating system influences how the data protection operation is performed.

14. The non-transitory computer readable medium of claim 11, wherein performing a consistency check includes freezing input/output operations to the volume.

15. The non-transitory computer readable medium of claim 11, wherein performing a consistency check includes flushing data, including cached data to the volume.

16. The non-transitory computer readable medium of claim 11, wherein performing a consistency check includes determining an application type.

17. The non-transitory computer readable medium of claim 11, further comprising signaling that the data protection operation is ready to be performed.

18. The non-transitory computer readable medium of claim 14, further comprising restarting the input/output operations after the data protection operation is completed.

19. The non-transitory computer readable medium of claim 11, wherein the data protection operation is a backup operation.

20. The non-transitory computer readable medium of claim 19, wherein the main application is rescheduled on a different node.

* * * * *